United States Patent [19]

Duell et al.

[11] Patent Number: 4,621,839

[45] Date of Patent: Nov. 11, 1986

[54] METHOD AND APPARATUS FOR MOUNTING COUPLING AND TUBE ASSEMBLIES TO SUPPORTS

[75] Inventors: Richard J. Duell, Syracuse; Charles E. Whipple, Brewerton, both of N.Y.

[73] Assignee: Carrier Corporation, Syracuse, N.Y.

[21] Appl. No.: 507,610

[22] Filed: Jun. 24, 1983

[51] Int. Cl.[4] .............................................. F16L 3/00
[52] U.S. Cl. .................................... 285/61; 285/184; 285/158; 285/330; 29/469
[58] Field of Search .................... 248/75, 56; 285/124, 285/157, 158, 184, 61, 330, 62, 63, 64, 192, 205, 189; 29/469

[56] References Cited

U.S. PATENT DOCUMENTS

| | | | |
|---|---|---|---|
| 783,987 | 2/1905 | Walsh | 285/184 |
| 3,425,452 | 2/1969 | Shaw | 285/158 X |
| 3,873,136 | 3/1975 | Curry | 285/330 X |
| 4,363,337 | 12/1982 | Pease | 285/330 X |
| 4,420,022 | 12/1983 | Landry | 285/330 X |

Primary Examiner—Dave W. Arola
Attorney, Agent, or Firm—Dana F. Bigelow

[57] ABSTRACT

A mounting arrangement for securing a tubing subassembly without requiring fixturing of the tubing relative to a coupling is disclosed. A mounting bracket including arcuate openings is designed to receive the coupling. A mounting flange having fastener receiving openings is positioned to secure the coupling in position such that fasteners may be inserted through the arcuate slots to secure the mounting bracket to the mounting flange to maintain the coupling and the attached tubing subassembly in the desired configuration and orientation.

5 Claims, 4 Drawing Figures

METHOD AND APPARATUS FOR MOUNTING COUPLING AND TUBE ASSEMBLIES TO SUPPORTS

BACKGROUND OF THE INVENTION

1. Field of the Invention

The present invention relates to heat exchange units. More specifically, the present invention relates to apparatus and a method for mounting a coupling to a planar support wherein the coupling and the mounting flange therefor may be positioned relative to a tube subassembly without regard to their relative rotational orientation.

2. Prior Art

Many heat exchange units include a heat exchanger located within a housing. Refrigerant is supplied to the heat exchanger to effect the transfer of heat energy between refrigerant and air flowing over the heat exchanger. In a conventional residential air conditioning system, liquid line and suction line headers extend from the heat exchanger outwardly through the housing of the heat exchange unit and are joined to a coupling such that refrigerant lines connecting the heat exchanger to the remainder of the refrigeration circuit may be affixed to the heat exchanger by connecting the lines to the coupling located exterior of the housing.

During assembly of these heat exchange units it has been necessary to provide a subassembly which includes various sections of tubing, headers, couplings, valves and other components designed to extend from the spigot or bell joints on the heat exchanger through an opening in the housing. This single assembly would then act to conduct refrigerant from the heat exchanger to the coupling extending outside the housing adapted to connect to interconnecting refrigerant tubing.

The coupling typically includes a body portion having threads extending from one end and a bell portion extending from the other end to which the tube may be soldered. Intermediate the threads and the bell end a head portion having a series of faces arranged in a spaced pattern about the coupling is provided such that a wrench may be placed to engage these faces to secure the coupling from the final displacement. To prevent the coupling from rotating after assembly a mounting flange is secured to a support through which the coupling extends. The mounting flange likewise defines a series of faces which may coact with the coupling faces much in the manner of a wrench for securing the coupling in position. The flange additionally defines a series of openings to which a fastener may be mounted. Typically the fastener would extend through an opening in the support to engage the opening in the flange. In this type of arrangement it is necessary to fixture the entire subassembly prior to soldering the tubing to the coupling such that alignment of the fastening openings of the flange with the fastening openings in the support would result in the tube assembly extending in the proper rotational orientation from the support. This additional fixturing step required additional time and effort to effect assembly of the coil unit.

The herein disclosed apparatus and method involves soldering or joining tubing to a coupling without regard to the orientation therebetween. Hence, no fixturing is necessary. Arcuate slots are spaced about the opening in the support such that fastening means such as screws are inserted through the arcuate slots to engage the fastening openings in a flange. By rotation of the entire subassembly the screws rotate within the arcuate slots until the subassembly is in a desired position. The screws are then tightened securing the entire subassembly including the coupling and mounting flange to the support at the desired rotational angle. Hence, the subassembly is secured to the support at the desired rotational position without the necessity of the coupling being fixtured relative to the tube such that the mounting flange securing the coupling was in alignment with the support openings in the support.

SUMMARY OF THE INVENTION

It is an object of the present invention to provide a tubing subassembly for use in a heat exchange unit.

It is a further object of the present invention to provide apparatus for securing a tubing subassembly to a support.

It is a yet further object of the present invention to provide apparatus which acts to engage a coupling to secure the coupling relative to a support and which allows the coupling to be secured in various rotational positions relative to the support.

It is a still further object of the present invention to provide a method of assembling a heat exchange unit without necessitating the fixturing of tubing subassemblies relative to either a coupling or a mounting flange.

It is a further object of the present invention to provide a safe, economical and reliable and easy to assemble heat exchange unit incorporating arcuate slots for allowing relative rotational positioning of the components.

Other objects will be apparent from the description to follow and the appended claims.

The above objects are achieved according to the preferred embodiment of the invention by the use of a tubing assembly in a heat exchange unit which may be secured in a selected position and in a selected orientation. A planar mounting bracket defines an opening and arcuate fastening slots spaced from the opening. The coupling, including a coupling body sized to extend through the opening in the mounting bracket, a head portion extending outwardly from the coupling body and sized larger than the mounting bracket opening and a bell portion extending from the coupling body are further disclosed. Tubing is connected to the coupling without regard to the rotational orientation of the coupling at the bell portion thereof, said tubing having a desired orientation relative to the unit. A mounting flange defining a bell opening through which the bell portion of the coupling extends, a head receiving cavity sized to secure the head portion of the coupling and at least one fastening opening is provided. Fastening means which extend through at least one fastening slot to engage a fastening opening of the mounting flange to secure the coupling head portion between the mounting flange and the mounting bracket are utilized, said fastening means being positioned within the fastening slot to place the tubing in the desired rotational orientation relative to the unit.

DESCRIPTION OF THE PREFERRED EMBODIMENT

The embodiment as described herein is adapted for use in a heat exchange unit having a tubing subassembly connecting the heat exchanger through the housing such that external refrigerant connections may be made therebetween. It is to be understood that similar applications for maintaining tubular subassemblies relative to a planar support are within the scope of this application.

Figure 3:
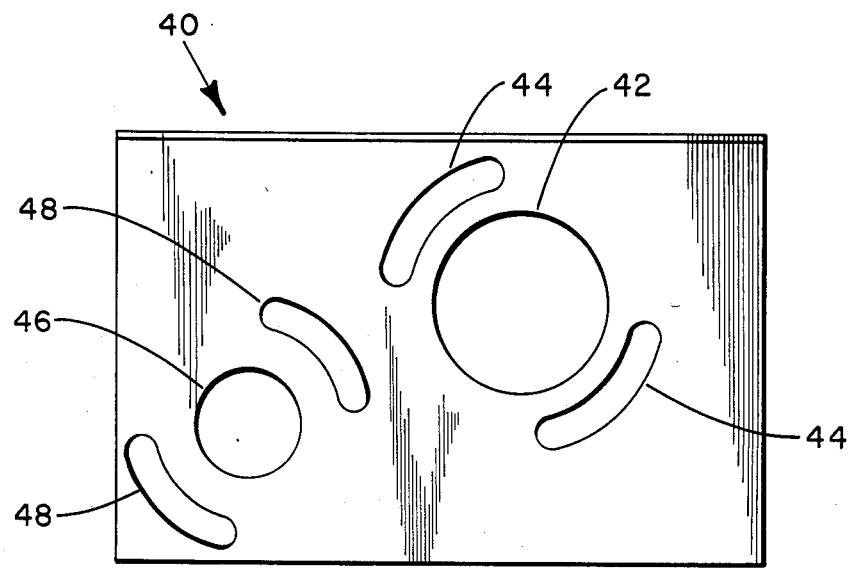
FIG. 3 is an end view of a mounting bracket.

As shown and described herein, reference is made to a single tube assembly extending through a single opening in a mounting bracket. As shown in FIG. 3, multiple mounting bracket openings are provided such that multiple assemblies for use with a single heat exchanger may be provided. Other applications might involve numerous subassemblies extending through a single planar member such as when numerous piping connections are made to multiple heat exchange units from a single compressor bearing unit. Additionally, the subassembly as involved may include nothing in addition to a single piece of tubing extending from a coupling to the heat exchanger or coil. Other subassemblies might additionally include check valves, solenoid valves, headers, multiple connections and other various components utilized in directing refrigerant from various sized heat exchangers.

Figure 1:
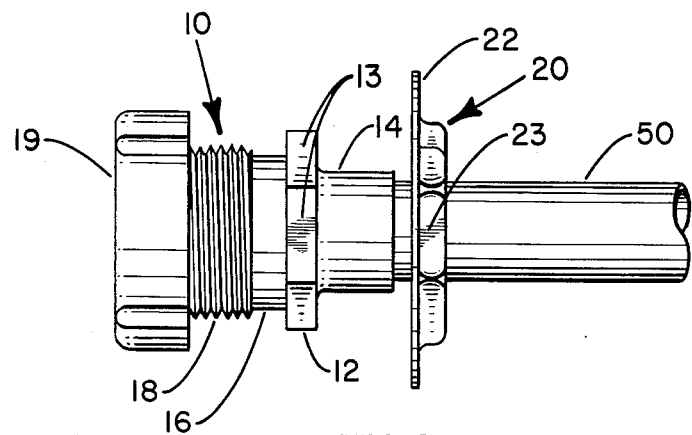
FIG. 1 is a side view of a portion of a tubing and coupling subassembly.

Referring now to FIG. 1 there may be seen a view of a portion of a tubing assembly. Coupling 10 is shown having a coupling body 16 including a threaded portion 18 and a cap 19 rotatably threaded onto threaded portion 18. Head portion 12 defining a series of faces 13 is connected to coupling body 16 as is bell portion 14. Bell portion 14 extends in a direction opposite the threaded portion 18 and defines a cylindrical cavity for the receipt of tube 50. Mounting flange 20 is shown located about tube 50 and includes annular portion 22 about the exterior thereof and faces 23 which define a portion of head receiving cavity. Faces 23 act to mesh with faces 13 of the coupling when assembled to prevent relative rotation between the coupling and the mounting flange.

Figure 2:
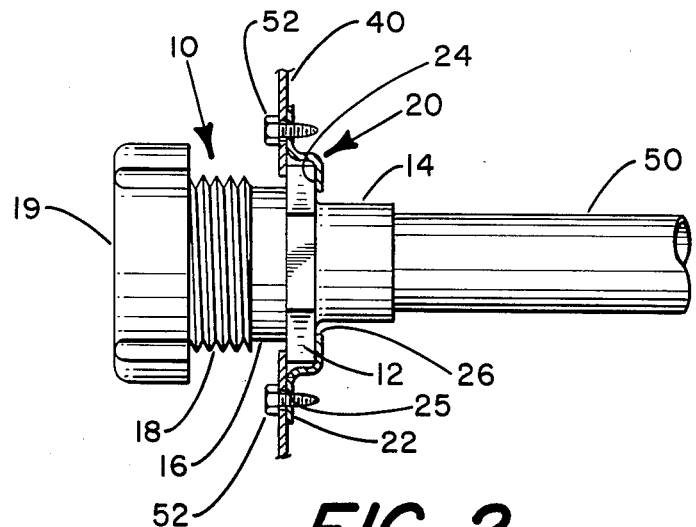
FIG. 2 is a partially sectional side view of a portion of a coupling and tubing assembly shown mounted to a mounting bracket.

FIG. 2 is a view similar to FIG. 1 additionally including mounting bracket 40 and showing the components assembled. Again, coupling 10 is shown including a threaded portion, coupling body 16, cap 19, head portion 12 and bell portion 14. Mounting bracket 40 is shown extending vertically and defining an opening through which the coupling body extends. Coupling head portion 12 is shown sized sufficiently large so as not to extend through the coupling opening in the mounting bracket. Tube 50 is shown inserted within bell portion 14 of the coupling. Mounting flange 20 is shown defining a head receiving cavity 24 into which the head portion 12 of the coupling is engaged. Head receiving cavity 24 includes faces 23 as shown in FIG. 1 which act to mesh with faces 13 of the head portion 12 to prevent relative rotation therebetween. Additionally shown are fasteners 52 having a head located on one side of mounting bracket 40 and threads which extend through mounting bracket 40 and into mounting flange 20 to secure the mounting flange relative thereto. When tightened, fasteners 52 act to secure the mounting flange from relative rotation with the mounting bracket and the mounting flange acts to secure the coupling from relative rotation between the coupling and the mounting flange and consequently the mounting bracket. Hence, when assembled as shown, all of the coupling, tubing, mounting bracket and mounting flange are secured relative to each other.

FIG. 3 is an end view of mounting bracket 40. In this view of the mounting bracket there is shown a vapor line coupling opening 42 and two arcuate fastening slots 44 spaced from the vapor line coupling opening. As may further be seen in FIG. 3, the vapor line coupling opening is circular in configuration having its axis as the center point. Additionally, the axis for the two arcuate fastening slots is the identical center point. Each fastening slot is designed to extend through approximately 60° of rotational displacement.

Mounting bracket 40 additionally defines a liquid line coupling opening 46 and coacting fastening slots 48. This mounting bracket is designed to secure both the liquid line coupling and the vapor line coupling extending from a single heat exchanger such that both external refrigerant connections may be made at the same location.

Figure 4:
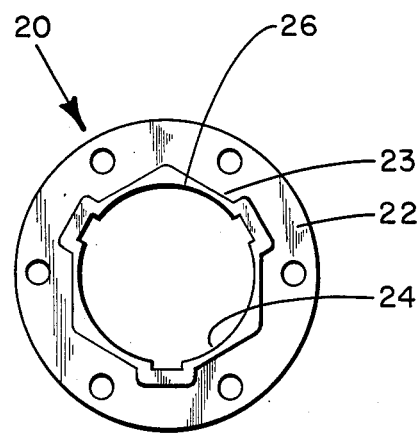
FIG. 4 is an end view of a mounting flange.

FIG. 4 is an end view of mounting flange 20. In FIG. 4 it can be seen that mounting flange 20 includes annular portion 22 about the periphery thereof which defines six fastening openings 24. Each fastening opening is sized to receive a screw thread to secure the mounting flange to the mounting bracket. The mounting flange additionally defines a bell opening 26 sized to allow bell portion 12 of the coupling to extend therethrough. A head receiving cavity 24 is additionally shown having faces 23 formed as a part thereof. The head portion 12 of the coupling, when assembled, extends into the head receiving cavity with faces 23 meshing with the faces of the head portion to prevent relative rotation therebetween.

Assembly of the various components is accomplished by first placing the mounting flange over tube 50 and then securing tube 50 within bell portion 14 of the coupling. This securing is typically a soldering operation to provide a refrigerant tight joint. The remainder of the subassembly is additionally formed by joining other tubing components, connectors, valves and other elements to the subassembly. The subassembly may then be mounted to the heat exchanger or may first be mounted to the support. The coupling next is placed in position to be inserted through the coupling opening in the mounting bracket after cap 19 has been removed. The coupling is inserted through the opening such that head portion 12 abuts against one side of the mounting bracket. Cap 19 may be then rethreaded onto the coupling body to maintain the cap in position. The entire subassembly is then rotated until the tubing is in the desired position. Then the fasteners 52 are inserted through the fastening slots 44 to engage appropriate fastening openings 25 of the mounting flange. The fasteners are then tightened in position to secure the entire assembly. Since there are six fastening openings 25 in the mounting flange, a fastening opening will be available in any position if the relative rotation between the mounting flange and the mounting bracket is a minimum of 60°. Hence, the fastening slots are designed to extend through a minimum of 60° of rotational arc such that no matter what the position of the mounting flange, a fastening opening will be available for use within the area available through the fastening slot. Hence, no matter what the orientation of the tubing, the fastener may be utilized to secure the mounting flange to the mounting bracket to secure the coupling therebetween.

The coupling, as described herein, may be a commercial coupling suitable for many purposes. Aeroquip Corporation is one manufacturer of such a coupling.

This coupling may perform other functions such as including an internal seal for trapping refrigerant within the heat exchanger, said seal being broken by tightening cap 19 on the threaded portion to provide fluid communication through the refrigerant circuits. The coupling may additionally include means for securing a section of tubing forming a refrigerant line connection thereto.

As set forth herein, the invention has been described in reference to a particular embodiment. It is to be understood by those skilled in the art that variations and modifications can be effected within the spirit and scope of the invention.

What is claimed is:

1. Apparatus for securing a tubing assembly for use in a heat exchanger unit in a selected position and in a selected orientation which comprises:

a planar mounting bracket defining an opening and arcuate fastening slots spaced from the opening;

a coupling including a coupling body sized to extend through the opening in the mounting bracket, a head portion extending radially outwardly from the coupling body and sized larger than the mounting bracket opening and a bell portion extending axially from the head portion of the coupling body;

tubing connected to the coupling without regard to the rotational orientation of the coupling at the bell portion thereof, said tubing having a desired orientation relative to the unit;

a mounting flange defining a bell opening through which the bell portion of the coupling extends, a head receiving cavity sized to contain the head portion of the coupling and at least one fastening opening;

means for limiting the rotation of the head portion within said head receiving cavity; and fastening means extending through at least one of said arcuate fastening slots to engage said fastening opening of the mounting flange to secure the coupling head portion between the mounting flange and the mounting bracket, said fastening means being positioned within the fastening slot to prevent relative rotation between said mounting bracket and said mounting flange to place thereby and hold the tubing in the desired rotational orientation relative to the mounting bracket.

2. The apparatus as set forth in claim 1 wherein the mounting flange defines six equally spaced fastening openings, wherein the arcuate fastening slots extend through at least sixty degrees of arc about the opening whereby by selecting the appropriate fastening opening and by positioning that fastening opening relative to the arcuate slot, the fastening means will secure the coupling and attached tubing with the bell portion of the coupling extending through the bell opening and the tubing oriented at the desired angle.

3. The apparatus as set forth in claim 1 wherein said means for limiting rotation of the head portion within said head receiving cavity includes a plurality of planar coupling faces on said coupling head portion and wherein the mounting flange defines as a portion of the head receiving cavity a corresponding series of planar faces whereby upon assembly of the coupling to the mounting flange the mounting flange cavity faces engage the coupling faces to prevent relative rotation between the coupling and the mounting flange.

4. A method of assembling a tube assembly to a support having an opening therein, said tube assembly including a coupling mounted to the tube and a mounting flange positioned on the tube adjacent the coupling and having flange openings for the receipt of a fastener which comprises the steps of:

forming arcuate slots in the support about the opening therein;

inserting the coupling through the opening;

rotating the coupling with the attached tubing to the desired rotational position;

engaging the mounting flange to the coupling to secure the coupling from rotational movement within the opening and to abut against the support; and securing the coupling in the desired position by inserting a fastener through the appropriate portion of the arcuate slot and a flange opening of the mounting flange to engage the support and to prevent relative rotation therebetween.

5. The method as set forth in claim 4 wherein prior to the step of inserting the coupling through the opening in the support the method further comprises the steps of:

inserting the tubing to be joined to the coupling through a center opening in the mounting flange; and joining the tubing to the coupling to form a tube subassembly.

* * * * *